United States Patent
Brookes et al.

(10) Patent No.: US 10,197,062 B2
(45) Date of Patent: Feb. 5, 2019

(54) AERO-ENGINE LOW PRESSURE PUMP

(71) Applicant: Rolls-Royce PLC, London (GB)

(72) Inventors: David Brookes, Derby (GB); Martin K. Yates, Derby (GB)

(73) Assignee: ROLLS-ROYCE PLC, London (GB)

(*) Notice: Subject to any disclaimer, the term of this patent is extended or adjusted under 35 U.S.C. 154(b) by 113 days.

(21) Appl. No.: 15/256,108

(22) Filed: Sep. 2, 2016

(65) Prior Publication Data

US 2017/0184111 A1    Jun. 29, 2017

(30) Foreign Application Priority Data

Oct. 21, 2015 (GB) .................................. 1518624.0

(51) Int. Cl.
*F04D 15/00* (2006.01)
*F02C 7/236* (2006.01)
(Continued)

(52) U.S. Cl.
CPC ............ *F04D 15/0066* (2013.01); *F02C 7/22* (2013.01); *F02C 7/236* (2013.01); *F02C 9/30* (2013.01);
(Continued)

(58) Field of Classification Search
CPC .. F04D 13/06; F04D 15/0066; F04D 15/0088; F04D 29/22
See application file for complete search history.

(56) References Cited

U.S. PATENT DOCUMENTS 4,815,278 A * 3/1989 White ................... F02C 9/30
                                                       417/42
4,834,624 A    5/1989 Jensen et al.
(Continued)

FOREIGN PATENT DOCUMENTS

CA    1326297 C    1/1994
CA    2321608 A1   4/2001
(Continued)

OTHER PUBLICATIONS

U.S. Appl. No. 15/255,850, filed Sep. 2, 2016 in the name of Brookes et al.
(Continued)

*Primary Examiner* — Patrick Hamo
(74) *Attorney, Agent, or Firm* — Oliff PLC (57) ABSTRACT

An aero-engine low pressure pump is provided for supplying fuel at a raised pressure to a high pressure pump. The low pressure pump has a pumping mechanism which raises the pressure of fuel flowing though the mechanism. The low pressure pump further has electrical motor which drives the pumping mechanism. The low pressure pump further has a variable frequency motor drive which supplies electrical power to the electrical motor. The variable frequency motor drive measures the electrical power supplied to the electrical motor. The low pressure pump further has a control unit which compares the measured electrical power to a reference power, and, when the measured electrical power is less than the reference power by a predetermined amount, controls the motor drive to increase the power supplied to the electrical motor thereby increasing the pressure rise produced by the pumping mechanism.

11 Claims, 9 Drawing Sheets

(51) Int. Cl.
  *F02C 9/30*   (2006.01)
  *F02C 7/22*   (2006.01)
  *F02K 3/06*   (2006.01)
  *F04D 1/00*   (2006.01)
  *F04D 13/06*  (2006.01)
  *F04D 29/22*  (2006.01)

(52) U.S. Cl.
  CPC ............... *F02K 3/06* (2013.01); *F04D 1/00* (2013.01); *F04D 13/06* (2013.01); *F04D 15/0088* (2013.01); *F04D 29/22* (2013.01); *F05D 2210/13* (2013.01); *F05D 2210/132* (2013.01); *F05D 2220/32* (2013.01); *F05D 2260/80* (2013.01)

(56) References Cited

U.S. PATENT DOCUMENTS

| | | | |
|---|---|---|---|
| 4,836,147 A | 6/1989 | Morris | |
| 5,649,811 A | 7/1997 | Krol, Jr. et al. | |
| 5,785,013 A | 7/1998 | Sinn et al. | |
| 5,939,813 A | 8/1999 | Schob | |
| 6,174,143 B1 | 1/2001 | Horski et al. | |
| 6,447,262 B1 | 9/2002 | Clements | |
| 6,499,966 B1 | 12/2002 | Werson et al. | |
| 6,986,648 B2 | 1/2006 | Williams et al. | |
| 7,539,549 B1 | 5/2009 | Discenzo et al. | |
| 7,954,371 B2 | 6/2011 | Schofield et al. | |
| 8,622,713 B2 | 1/2014 | Hampton | |
| 8,774,972 B2 * | 7/2014 | Rusnak | F04D 15/0066 415/122.1 |
| 2004/0177602 A1 | 9/2004 | Griffiths et al. | |
| 2005/0284149 A1 | 12/2005 | Jansen et al. | |
| 2007/0065277 A1 | 3/2007 | Muller et al. | |
| 2008/0028742 A1 | 2/2008 | Parsons | |
| 2009/0199823 A1 | 8/2009 | Mahoney et al. | |
| 2011/0296846 A1 * | 12/2011 | Aurousseau | F02C 7/14 60/787 |
| 2014/0196463 A1 | 7/2014 | Zielinski et al. | |

FOREIGN PATENT DOCUMENTS

| | | |
|---|---|---|
| DE | 10012663 A1 | 9/2001 |
| DE | 102009009898 A1 | 8/2010 |
| EP | 1344917 A2 | 9/2003 |
| EP | 2 088 302 A2 | 8/2009 |
| GB | 1225777 A | 3/1971 |
| WO | 2010/118999 A1 | 10/2010 |
| WO | 2011/012356 A1 | 2/2011 |

OTHER PUBLICATIONS

May 4, 2018 Office Action issued in U.S. Appl. No. 15/255,850.
Sep. 26, 2018 Office Action issued in U.S. Appl. No. 15/255,850.
Dec. 17, 2018 Office Action issued in U.S. Appl. No. 15/255,850.

* cited by examiner

AERO-ENGINE LOW PRESSURE PUMP

FIELD OF THE INVENTION

The present invention relates to art aero-engine low pressure pump for supplying fuel at a raised pressure to a high pressure pump.

BACKGROUND

A typical fuel pumping unit for an aero-engine comprises a low pressure (LP) pump operable to draw fuel from a fuel tank, and supplying the fuel at boosted pressure to the inlet of a high pressure (HP) pump. The inter-stage flow between LP and HP pumps is typically used to cool engine lubrication oil in a fuel/oil heat exchanger.

Commonly, the LP pump comprises a centrifugal impeller pump whilst the HP pump comprises a positive displacement pump in the form of a twin pinion gear pump. The pumps are generally driven from a shaft on the engine accessory gearbox and therefore have a fixed speed relationship with engine running speed.

At sea level, aviation fuel dissolves air. When the partial pressure of the fuel tanks is reduced, due to increase in altitude, this air is released from the fuel. The resultant air/fuel mixture produces a multi-phase flow. Multi-phase flow can also occur at sea level, albeit to a lesser extent, as a result of pressure losses along the pipes.

In order to operate correctly and reliably, the HP pump requires fuel in a homogeneous state and not an air/fuel mixture. Increasing the inlet pressure to the HP pump forces, any undissolved air back into solution. The required pressure rise is normally provided by the operation of the aircraft wing tank pumps. The fuel pumping unit, however, should be able to operate correctly even when the wing pumps are not functioning. In this case, the required HP pump inlet pressure rise is provided solely by the LP pump.

SUMMARY

It would be desirable to be able to detect the presence of air in the fuel (i.e. multi-phase flow) at the LP pump, and then compensate for this by increasing the speed of the LP pump in order to produce an appropriate HP pump inlet pressure rise.

Moreover, when there is a fixed speed relationship with engine running speed, the overall size of the LP pump is dictated by the need to provide the required pressure rise with multi-phase flow. Thus it would be desirable for the LP pump to be able to be driven at different speeds to the HP pump Accordingly, in a first aspect, the present invention provides an aero-engine low pressure pump for supplying fuel at a raised pressure to a high pressure pump, the low pressure pump having:
  a pumping mechanism which raises the pressure of fuel flowing though the mechanism;
  an electrical motor which drives the pumping mechanism; and
  a variable frequency motor drive which supplies electrical power to the electrical motor;
  wherein the variable frequency motor drive measures the electrical power supplied to the electrical motor; and
  wherein the pump further has a control unit which compares the measured electrical power to a reference power, and, when the measured electrical power is less than the reference power by a predetermined amount, controls the motor drive to increase the power supplied to the electrical motor (e.g. restoring the supplied power to the reference power) thereby increasing the pressure rise produced by the pumping mechanism.

In general, the fluid mass flow through the pump is proportional to the power consumed by the pump. Thus, as multi-phase flow has a lower density than a fuel flow in which any air is dissolved in the fuel, it is possible to determine, through the power measurement, if the density of the fluid flowing in the LP pump has changed. In particular, having the comparison less than the reference power by the predetermined amount can be indicative of multi-phase flow through the LP pump, whereby it is possible to detect and accommodate for multi-phase flow in the pump.

Also, using the electrical motor to drive the pumping mechanism allows the LP pump to be driven at different speeds to the HP pump and at speeds independent of engine running speed. In particular, to provide a required pressure rise to deal with multi-phase flow, the LP pump can simply be run at a higher speed rather than increasing the size of the pump.

In a second aspect, the present invention provides a fuel pumping unit for an aero-engine, the fuel pumping unit having a low pressure pump and a high pressure pump, the low pressure pump supplying fuel at a raised pressure to the high pressure pump for onward supply to a fuel metering unit of the engine, wherein the low pressure pump is a pump according to the first aspect.

In a third aspect, the present invention provides a fuel pumping system for an aero-engine, the system having a fuel pumping unit according to the second aspect, and further having one or more fuel tank pumps which send fuel to the low pressure pump.

In a fourth aspect, the present invention provides an aero-engine (such as a gas turbine engine) having a fuel pumping unit according to the second aspect, or a fuel pumping system according to the third aspect.

Optional features of the invention will now be set out. These are applicable singly or in any combination with any aspect of the invention.

The variable frequency motor drive typically comprises inverter power electronics.

The supplied electrical power may be measured by measuring the current and voltage supplied to the electrical motor.

The supplied electrical power may be measured by integrating the instantaneous electrical power supplied to the electrical motor over plural power supply cycles.

The reference power may be determined from a stored model of pump performance. Another option, however, is for reference power to be based on one or more previous electrical power measurements by the variable frequency motor drive. For example, the reference power may be a previous power measurement at a time when the pump was operating under the same or greater engine fuel demand and known to be operating without multi-phase flow. Typically, the control unit increases the motor speed (i.e. phase frequency) to increase the power supplied to the electrical motor.

Conveniently, the measurement of the supplied electrical power may be synchronised to the frequency of a variable pulse-width modulation (PWM) used by the variable frequency motor drive to supply the electrical power. This can help to reduce processor overhead as computation can be synchronised around a common timing.

The control unit can repeat the comparison and correspondingly control the motor drive to increase the power supplied to the electrical motor by repeated increments (e.g. up to a maximum number) until the measured electrical power is no longer less than the reference power by the predetermined amount. A fault counter can be incremented on each power supply incrementation. When the fault counter reaches a threshold an alert flag can be set.

When the measured electrical power is greater than the reference power by a further predetermined amount (which can be indicative of the end of multi-phase flow through the low pressure pump), the control unit can control the variable frequency motor drive to decrease the power supplied to the electrical motor (e.g. restoring the supplied power to the reference power) thereby decreasing the pressure rise produced by the pumping mechanism. Typically, the control unit decreases the motor speed (i.e. phase frequency) to decrease the power supplied to the electrical motor. Again, the control unit can repeat the comparison and correspondingly control the motor drive to decrease the power supplied to the electrical motor by repeated increments (e.g. up to a maximum number) until the measured electrical power is no longer greater than the reference power by the further predetermined amount.

The fuel may be sent to the low pressure pump by one or more fuel tank pumps (e.g. wing fuel tank pumps). The control unit may then further monitor the health of the, or each, fuel tank pump from the comparison of the measured electrical power to the reference power. For example, the control unit can set an alert flag if the comparison suggests (e.g. because the measured electrical power is less than the reference power by a predetermined amount) a tank pump failure. Thus measuring the electrical power supplied to the electrical motor not only allows the LP pump to accommodate multi-phase flow, but also allows the condition of the fuel tank pumps to be monitored.

The engine may be a gas turbine engine.

The pumping mechanism may be a centrifugal impeller rotated by the electrical motor. The motor may be a brushless motor. For example, embodiments of the pump may have, a brushless electrical motor including a stator assembly and a rotor ring arranged externally of the stator assembly; and a centrifugal impeller operatively connected to the rotor ring such that the electrical motor rotates the impeller, the impeller being configured to raise the pressure of a fluid which flows through the impeller between an inlet and an outlet thereof; wherein the pump is configured such that a portion of the raised pressure fluid flow is diverted to form a recirculation flow which circulates through and cools the electrical motor before being returned to the impeller for re-pressurisation thereby. By configuring the pump such that the recirculation flow cools the electrical motor, the pump can avoid a need to seal the rotor ring from the impeller. In particular, a rotating seal to prevent leakage around an input drive shaft to the impeller can be avoided. Thus, advantageously, integration of the motor and the impeller can be promoted. Also motor cooling can be enhanced, allowing the motor to operate at higher power. Moreover, because the pump can be run at a speed that raises the pressure of the fluid to a level that avoids multi-phase flow, dissolved air in the recirculation flow can be avoided, reducing the possibility of electrical breakdown within windings of the motor. Thus it may not be necessary to fully encapsulate the motor windings.

In these embodiments, the recirculation flow, can be returned to the inlet of the impeller or to an axial location between the inlet and the outlet. The recirculation flow can be returned to the impeller through gaps in the electrical motor. Conveniently, the electrical motor can be fully immersed in the pumped fluid. Conveniently, the centrifugal impeller can be coaxial with the motor. The centrifugal impeller may have an inducer section which extends from an inlet for the fluid flow towards a (typically annular) outlet for the fluid flow. The centrifugal impeller may further have an exducer section located in flow series between the inducer section and the outlet. Conveniently, the rotor ring can be located within the impeller (e.g. within the inducer section) such that the raised pressure fluid flow passes radially outwardly of the rotor ring towards the outlet. This can enable a compact pump arrangement. Also the rotor ring magnetic elements, whether permanent magnets or magnetic pole pieces, can be contained within the inducer section. Since the action of centrifugal force is to move these magnetic elements radially outwards, the impeller can perform the containment without a need for e.g. an additional rotor sleeve. In particular, further containment of the rotor magnets can be avoided. However, another option is for the rotor ring to be mounted outside the impeller such that only the recirculation flow passes radially outwardly of the rotor ring. The pump may further have a volute at an annular outlet to collect the raised pressure fluid flow therefrom.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
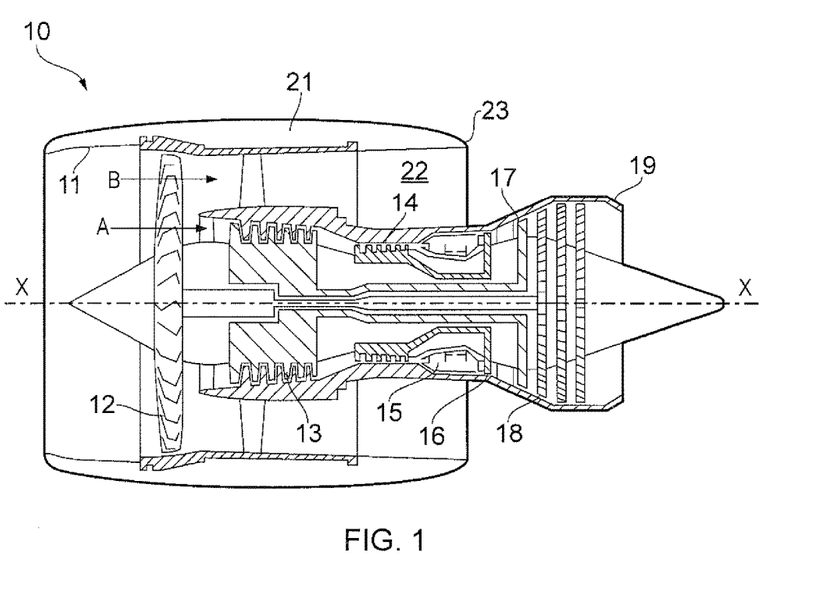
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine has a fuel pumping unit (not shown in FIG. 1) which receives fuel from one or more local pumps associated with respective aircraft wing fuel tanks, and supplies pressurised fuel to a fuel metering unit of the engine. The metered fuel is then sent to the burners of the combustion equipment 15.

The pumping unit has an LP and an HP pump. The HP pump can be a positive displacement (e.g. twin pinion gear) pump driven from a shaft on an engine accessory gearbox and having a fixed speed relationship with engine running speed. The LP pump, by contrast, has a pumping mechanism which can be in the form of a centrifugal impeller, and an electrical motor which drives the pumping mechanism (i.e. rotates the impeller). Moreover, the pump has a variable frequency motor drive, which typically comprises inverter power electronics and may be used to vary the speed of the pump mechanism. Thus the electrical motor allows the pump to be run at speeds independent of engine running speed. To provide a pressure rise to force any undissolved air in the fuel back into solution, the pump can simply be run at a higher speed.

The variable frequency drive measures the current supplied to the motor windings (known as the phase current) to allow the motor to be successfully controlled. In addition, the variable frequency drive measures the phase voltage. This allows a control unit associated with the drive to calculate the power supplied to the motor. For example, the instantaneous voltage and current can be measured, and the resultant calculated instantaneous power can then be integrated across a defined period, such as a number of drive output cycles (typically a minimum of two).

Conveniently, the voltage and current measurement may be synchronised to the motor pulse width modulation frequency as this defines the fastest rate that the system can, adjust the phase voltage, and therefore motor phase current. This synchronisation may also help to reduce processing overheads as computation can be synchronised around a common timing.

As the fluid mass flow through the pump is proportional to the power consumed, it is possible for the control unit to determine, through the power measurement described above, if the density of the fluid flowing in the pump has changed in a way that is indicative of multi-phase flow. In particular, the control unit can compare the measured electrical power to a reference power, and, when the measured electrical power is less than the reference power by a predetermined amount suitable action can be taken, such as restoring pump performance to its previous pressure rise by controlling the motor drive to increase the speed of the pumping mechanism until the power consumed is comparable to that prior to the multi-phase flow being detected.

The reference power can be determined from a stored model of pump performance, or from one or more previous power measurements. Both approaches allow the comparison to be performed by the control unit as cyclic check.

In this way sufficient inlet pressure to the HP pump can be ensured without needing to "oversize" the LP pump to handle (generally infrequent) multi-phase flow events. The ability to increase the pump speed in the event of a failure in the wing tank pumps allows the LP pump to be smaller and better optimised for normal operating modes. The ability to detect multi-phase flow can also be used by the control unit to monitor the condition of the aircraft wing tank pumps. Thus the measured power can be used as both a detection and a control parameter.

Figure 2:
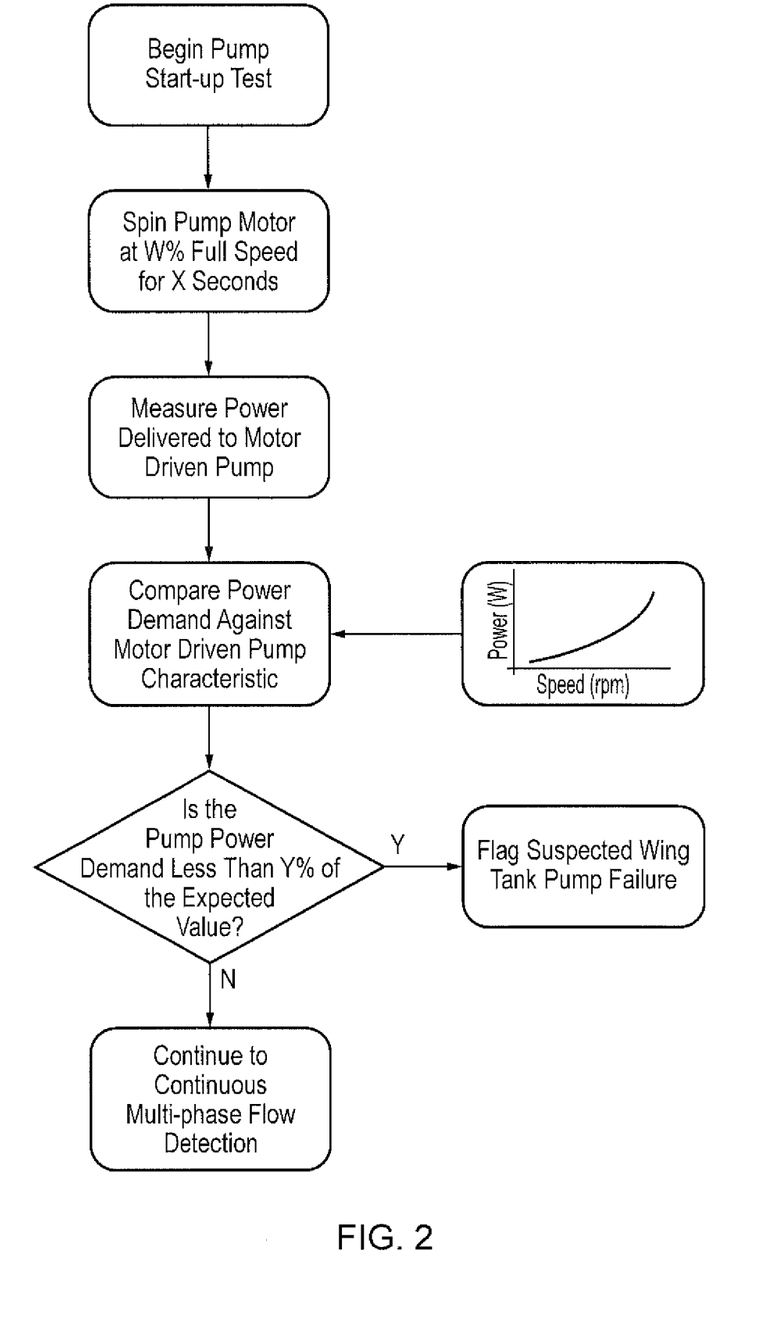
FIG. 2 shows an example flow chart for a start-up test for an LP pump.

FIG. 2 shows an example flow chart for a start-up test for the LP pump, which shows the pump acting as a health monitoring system for wing fuel tank pumps. In this test the pump speed is increased from zero to a defined percentage of full speed, a power measurement is made, and the value compared against a stored motor driven pump characteristic. If the measured pump power is less than the expected (reference) value by the predetermined amount (Y %), then a suspected wing tank pump failure is flagged by the control unit.

Figure 3:
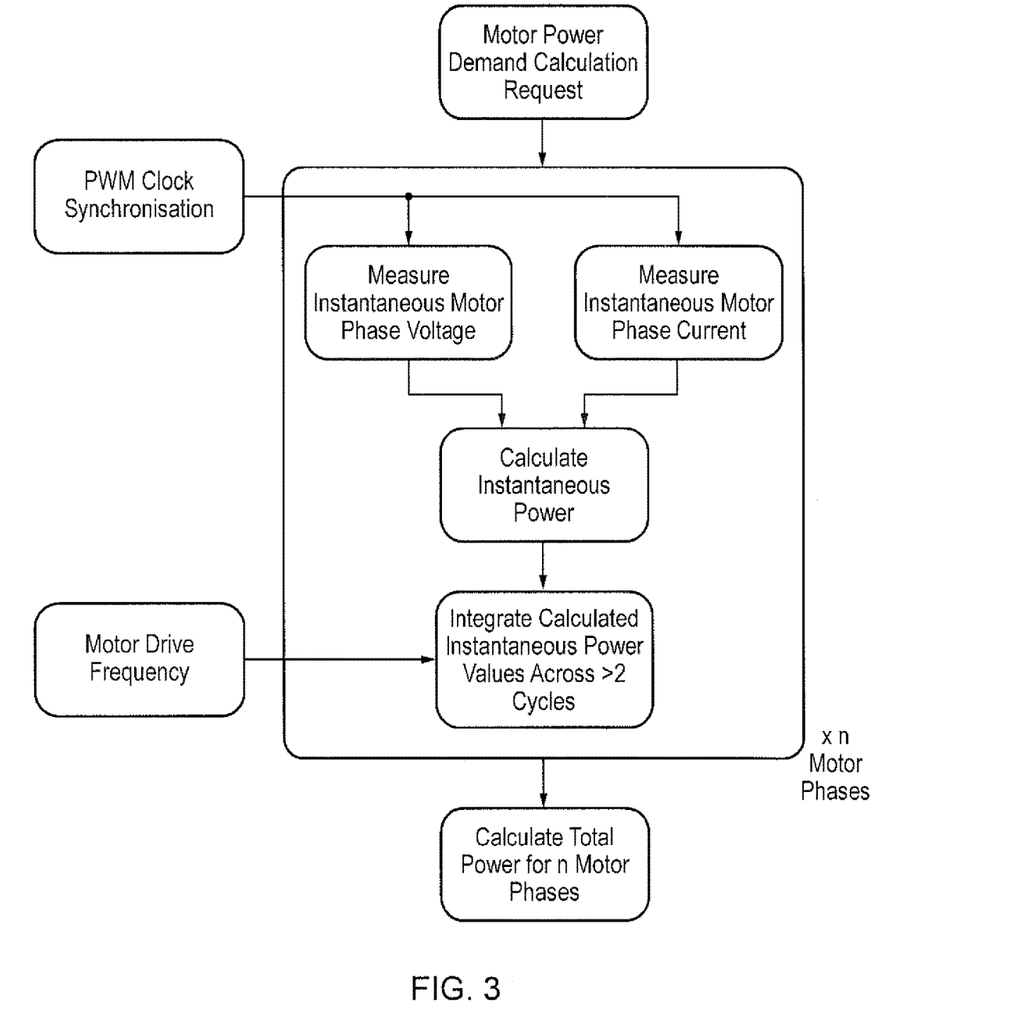
FIG. 3 shows an example flow chart for measurement of supplied power.

FIG. 3 shows an example flow chart for measurement, by the variable frequency motor drive and the control unit, of the supplied power using parameters available in the drive. In this example, the instantaneous measured power is integrated across plural drive output cycles.

Figure 4:
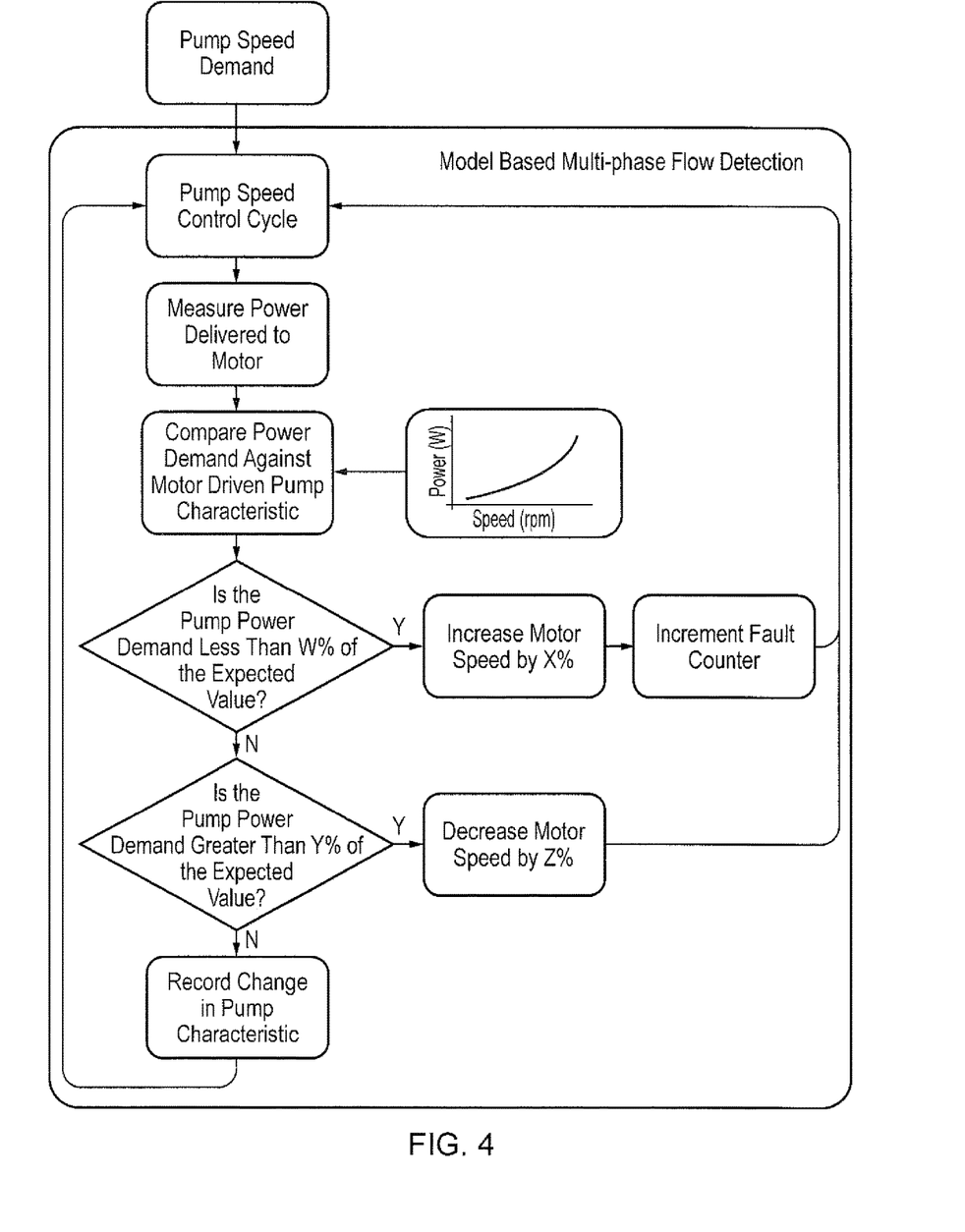
FIG. 4 shows an example flow chart of a continuous multi-phase flow check, where the measured power for a given pump speed is compared against a reference power derived from a stored motor driven pump characteristic.

FIG. 4 shows an example flow chart of a continuous multi-phase flow check, where the measured power for a given pump speed is compared against a reference power derived from a stored motor driven pump characteristic. If the measured power is less than a defined percentage of the characteristic the speed of the motor is increased and a fault counter incremented. A threshold on the fault counter can be used to flag an external fault. A second check is performed in the event of the measured power being greater than the characteristic. This can be used to decrease the motor speed should the presence of multi-phase flow cease due to external factors, such as a drop in altitude increasing the partial pressure in the aircraft wing tanks.

Figure 5:
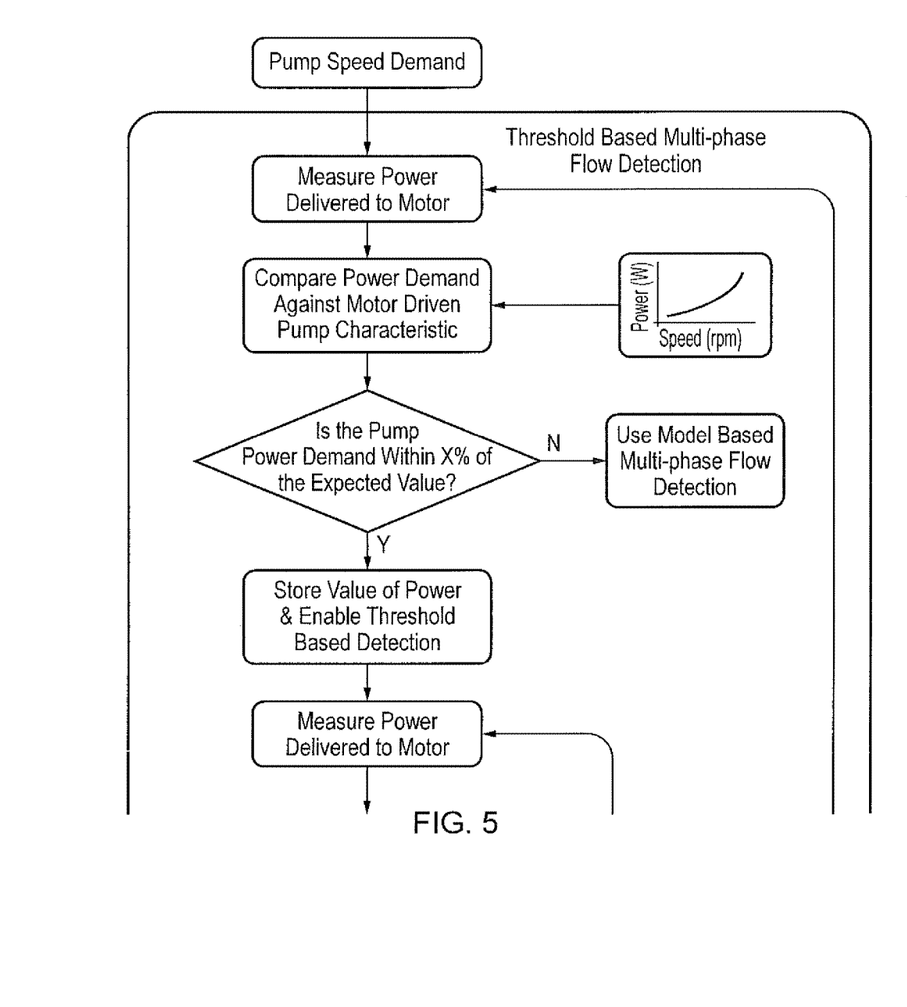
FIG. 5 shows an example flow chart of a threshold-based multi-phase flow check.

FIG. 5 shows an example flow chart of a threshold-based multi-phase flow check in which the reference power is a previous power measurement at a time when the pump was operating under the same engine fuel demand and known to be operating without multi-phase flow. An initial check is performed against a defined motor driven pump characteristic in a similar way as the example of FIG. 4 if the check against the characteristic is successful, a value of the required power is stored and used for subsequent threshold detection. A check is included that the demanded speed (i.e. engine fuel demand) has not decreased. If it has decreased, then the initial check is repeated. Again a fault counter, with an optional threshold to flag an external fault, can be included in the same manner as shown as the example of FIG. 4.

Figure 6:
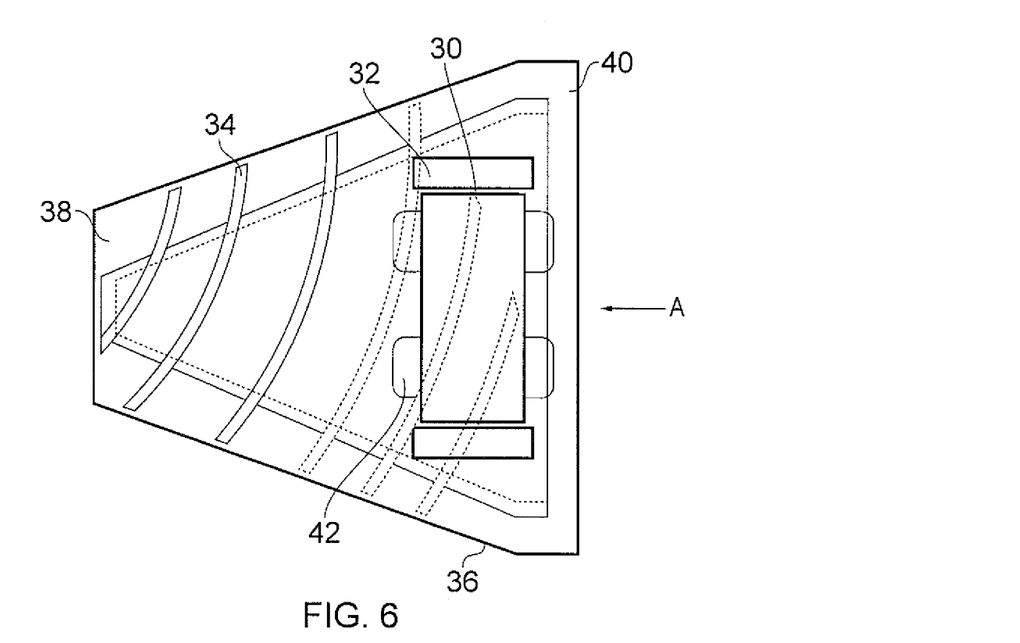
FIG. 6 shows schematically a longitudinal cross-section through an LP pump of a fuel pumping unit.
Figure 7:
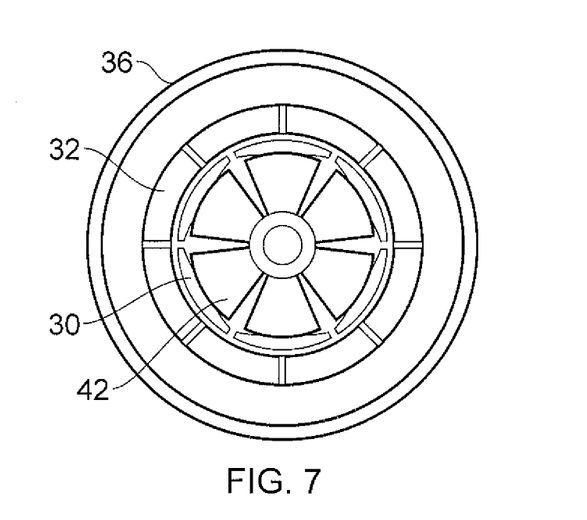
FIG. 7 shows schematically the rotor motor within the volume of the impeller in an end view of the pump of FIG. 6 from direction A.

As previously mentioned, the LP pump can be a centrifugal pump, as shown schematically in the longitudinal cross-section of FIG. 6. The LP pump is suitable for pumping a multi-phase fluid and has a centrifugal impeller driven by a brushless electrical motor having an inner stator assembly 30 and an external rotor ring 32. The impeller is coaxial with the motor and has an inducer section 34 located within a housing 36 of the pump. The inducer section expands from an axially-located inlet 38 in the housing towards an annular outlet 40. The stator and rotor are arranged to be substantially located within the inducer section such that further containment of the rotor magnetic elements is unnecessary, and a compact pump can be achieved. The pump may have a volute (not shown) at the annular outlet to collect the raised pressure fluid flow therefrom. FIG. 7 shows schematically an end view of the pump of FIG. 6 from direction A.

Figure 8:
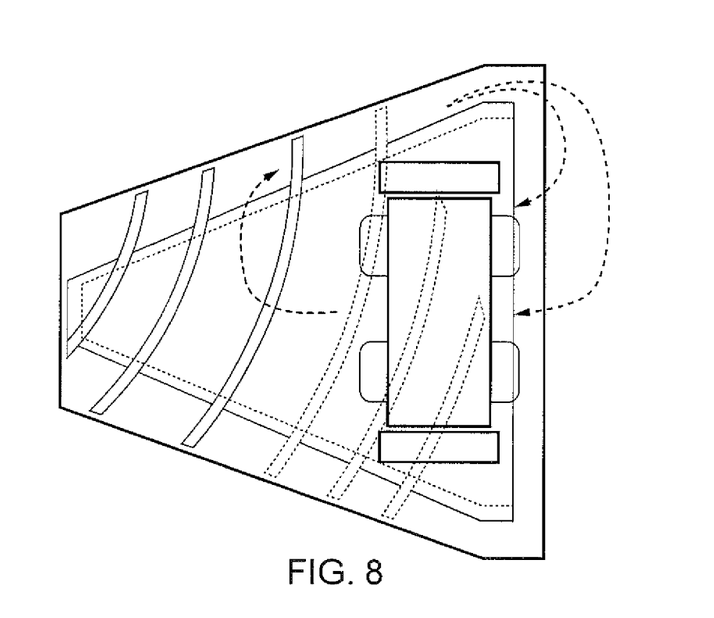
FIG. 8 shows a recirculation flow super-imposed on the cross-section of FIG. 6.

The pumped fuel flow passes radially outwardly of the rotor ring 32 en route to the outlet 40. However, as shown in FIG. 8, a portion of this flow (indicated by dotted, arrowed lines) is allowed to recirculate back to the impeller through the electrical motor, thus cooling the motor. In particular, the recirculation flow can flow through gaps in the motor, such as between coil windings 42 of the stator assembly and/or the gap between the stator assembly and the rotor ring. The recirculation flow can either be returned to the inlet 38 through an interior passage of the inducer section 34, or exit the interior of the inducer section 34 at an axial location between the inlet and the outlet as shown in FIG. 8. The recirculation flow can enable higher power applications than would otherwise be possible though natural convection cooling of the motor.

As the fuel is at a raised pressure any undissolved air (in the case of multi-phase flow) within the fuel air mix is forced back into solution and therefore the windings of the motor are not exposed to air. This reduces the possibility of electrical breakdown within the windings and avoids a need for full encapsulation of the windings. Moreover, the pump can avoid a need to seal the rotor ring from the impeller indeed, the electrical motor can be fully immersed in the pumped fuel.

Figure 9:
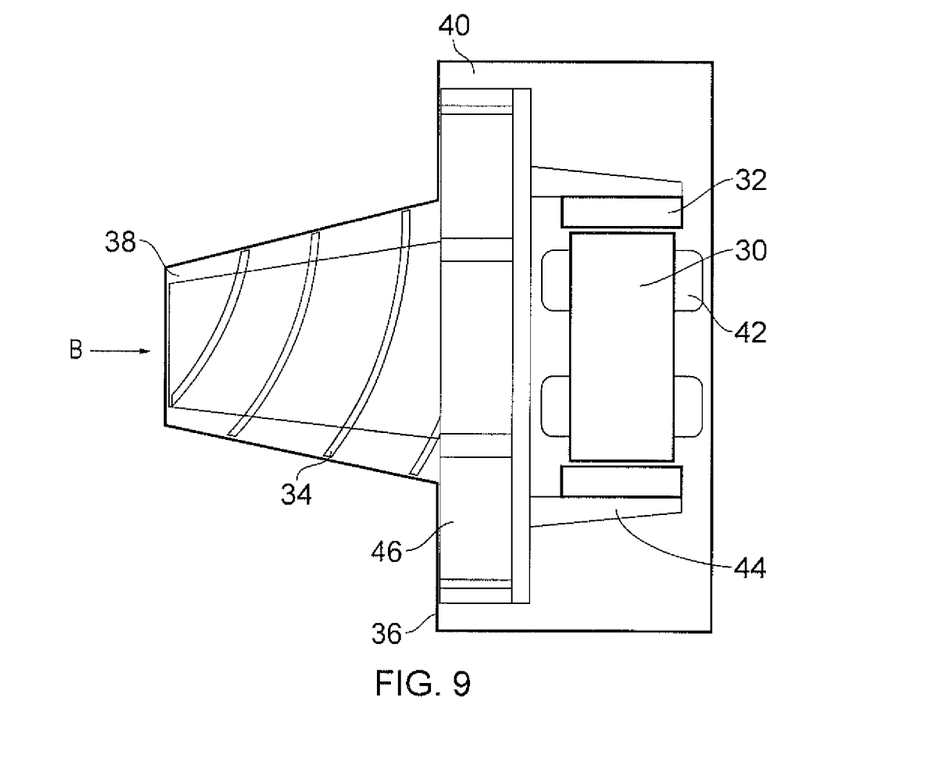
FIG. 9 shows schematically a longitudinal cross-section through a variant LP pump.
Figure 10:
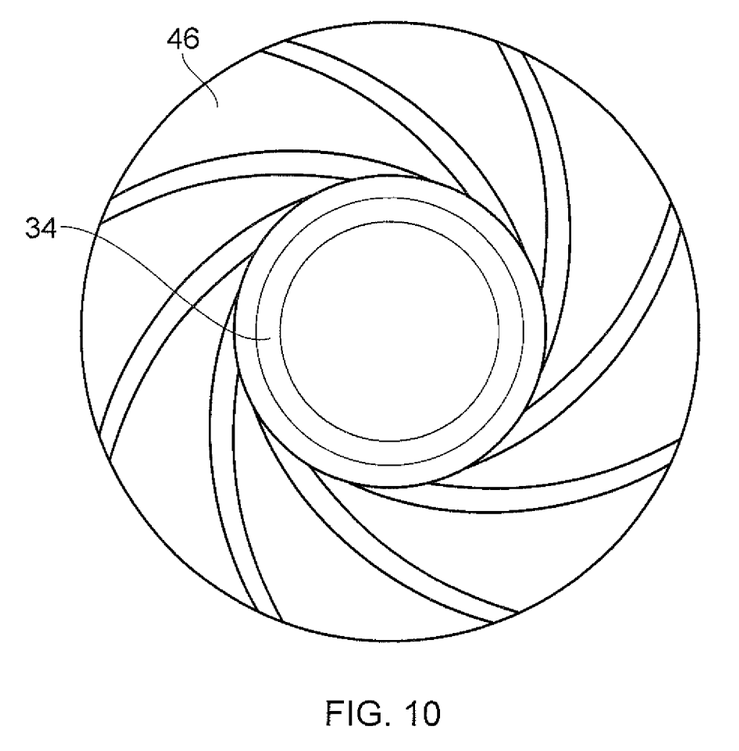
FIG. 10 shows schematically an end view of the pump of FIG. 9 from direction B.

FIG. 9 shows schematically a longitudinal cross-section through a variant of the LP pump. In this variant, the rotor ring 32 is located axially within an extension 44 from an exducer section 46 of the impeller. Thus only the recirculation flow passes radially outwardly of the rotor ring 32. The major part of the raised pressure flow passes from the inducer section 34 to the exducer section 46 before exiting through the annular outlet 40. However, the same motor cooling principal of recirculating outlet flow back towards the inlet is applicable to this variant FIG. 10 shows schematically an end view of the pump of FIG. 9 from direction B.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An aero-engine low pressure pump for supplying fuel at a raised pressure to a high pressure pump, the low pressure pump comprising:
    a pumping mechanism that raises the pressure of fuel flowing though the mechanism;
    an electrical motor that drives the pumping mechanism; and
    a variable frequency motor drive that supplies electrical power to the electrical motor;
    wherein the variable frequency motor drive measures the electrical power supplied to the electrical motor;
    wherein the pump further has a control unit that compares the measured electrical power to a reference power, and, when the measured electrical power is less than the reference power by a predetermined amount, controls the motor drive to increase the power supplied to the electrical motor thereby increasing the pressure rise produced by the pumping mechanism; and
    wherein the measurement of the supplied electrical power is synchronised to the frequency of a variable pulse-width modulation used by the variable frequency motor drive to supply the electrical power.

2. The low pressure pump according to claim 1, wherein the reference power is determined from a stored model of pump performance.

3. The low pressure pump according to claim 1, wherein the reference power is based on one or more previously determined electrical power measurements by the variable frequency motor drive.

4. The low pressure pump according to claim 1, wherein the control unit repeats the comparison and correspondingly controls the motor drive to increase the power supplied to the electrical motor by repeated increments until the measured electrical power is no longer less than the reference power by the predetermined amount.

5. The low pressure pump according to claim 1, wherein when the measured electrical power is greater than the reference power by a further predetermined amount, the control unit controls the variable frequency motor drive to decrease the power supplied to the electrical motor thereby decreasing the pressure rise produced by the pumping mechanism.

6. The low pressure pump according to claim 1, wherein the fuel is sent to the low pressure pump by one or more fuel tank pumps, the control unit further monitoring the health of the one or more fuel tank pumps from the comparison of the measured electrical power to the reference power.

7. The low pressure pump according to claim 1, wherein the pumping mechanism is a centrifugal impeller rotated by the electrical motor.

8. A fuel pumping unit for an aero-engine, the fuel pumping unit having a low pressure pump and a high pressure pump, the low pressure pump supplying fuel at a raised pressure to the high pressure pump for onward supply to a fuel metering unit of the engine, wherein the low pressure pump is a pump according to claim 1.

9. A fuel pumping system for an aero-engine, the system having a fuel pumping unit according to claim 8, and further having one or more fuel tank pumps that send fuel to the low pressure pump.

10. An aero-engine having a fuel pumping unit according to claim 8.

11. An aero-engine having a fuel pumping system according to claim 9.

* * * * *